United States Patent
Tokairin et al.

(10) Patent No.: US 10,569,654 B2
(45) Date of Patent: Feb. 25, 2020

(54) REGENERATED ENERGY DISPLAY DEVICE

(71) Applicant: MITSUBISHI JIDOSHA KOGYO KABUSHIKI KAISHA, Tokyo (JP)

(72) Inventors: Risa Tokairin, Tokyo (JP); Yohei Hashimoto, Tokyo (JP); Yoichi Kobayashi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 16/086,241

(22) PCT Filed: Feb. 16, 2017

(86) PCT No.: PCT/JP2017/005624
§ 371 (c)(1),
(2) Date: Sep. 18, 2018

(87) PCT Pub. No.: WO2017/169238
PCT Pub. Date: Oct. 5, 2017

(65) Prior Publication Data
US 2019/0176623 A1 Jun. 13, 2019

(30) Foreign Application Priority Data
Mar. 28, 2016 (JP) .................................. 2016-064077

(51) Int. Cl.
*B60K 35/00* (2006.01)
*B60L 7/14* (2006.01)
(Continued)

(52) U.S. Cl.
CPC ................ *B60K 35/00* (2013.01); *B60L 3/00* (2013.01); *B60L 7/14* (2013.01); *G06F 3/0482* (2013.01);
(Continued)

(58) Field of Classification Search
CPC ....... B60K 35/00; B60K 2370/52; B60L 3/00; B60L 7/14; B60L 3/12; B60L 7/10;
(Continued)

(56) References Cited

U.S. PATENT DOCUMENTS

| 8,433,473 | B2* | 4/2013 | Perkins | .................. B60K 35/00 701/32.8 |
| 2003/0137278 | A1* | 7/2003 | Kondo | .................. H02J 7/0047 320/132 |

(Continued)

FOREIGN PATENT DOCUMENTS

| EP | 2 473 378 A1 | 7/2012 |
| JP | 2003-219502 A | 7/2003 |

(Continued)

OTHER PUBLICATIONS

Extended European Search Report dated Mar. 27, 2019 issued in counterpart European Patent Application No. 17773786.3.

*Primary Examiner* — Joseph H Feild
*Assistant Examiner* — Rufus C Point
(74) *Attorney, Agent, or Firm* — Birch, Stewart, Kolasch & Birch, LLP (57) ABSTRACT

The present invention improves usability by making it possible to change a display gauge of an added amount of regenerated energy. A regenerated energy display device (1) according to the present invention is installed in a vehicle (10) that is capable of collecting the regenerated energy and comprises: a display unit (2) that is capable of displaying a graph (5) that shows an added amount (Aa) of regenerated energy; and a control unit (3) that controls the display unit (2) such that it is possible to change a gauge (the upper limit) of information indicating the added amount (Aa) displayed on the display unit.

4 Claims, 7 Drawing Sheets

(51) Int. Cl.
*H02J 7/00* (2006.01)
*B60L 3/00* (2019.01)
*G06F 3/0482* (2013.01)
*G06F 3/0484* (2013.01)
*B60L 3/12* (2006.01)
*B60L 7/10* (2006.01)

(52) U.S. Cl.
CPC ............ *G06F 3/04847* (2013.01); *H02J 7/00* (2013.01); *B60K 2370/52* (2019.05); *B60L 3/12* (2013.01); *B60L 7/10* (2013.01); *B60Y 2200/91* (2013.01); *B60Y 2200/92* (2013.01)

(58) Field of Classification Search
CPC ...... G06F 3/0482; G06F 3/04847; H02J 7/00; B60Y 2200/91; B60Y 2200/92
See application file for complete search history.

(56) References Cited

U.S. PATENT DOCUMENTS

| | | | | |
|---|---|---|---|---|
| 2007/0208468 A1* | 9/2007 | Sankaran | ............... | B60K 6/445 701/31.4 |
| 2007/0295544 A1* | 12/2007 | Borroni-Bird | ......... | B60K 35/00 180/165 |
| 2010/0102945 A1* | 4/2010 | Watson | .................. | B60K 35/00 340/462 |
| 2011/0023772 A1* | 2/2011 | Crombez | ............... | B60K 6/445 116/28 R |
| 2012/0053804 A1* | 3/2012 | Saida | ........................ | B60L 7/10 701/70 |
| 2012/0074768 A1* | 3/2012 | Naito | ........................ | B60T 1/10 303/3 |
| 2012/0179346 A1* | 7/2012 | Aldighieri | ................. | B60T 1/10 701/70 |
| 2012/0179347 A1* | 7/2012 | Aldighieri | ................. | B60T 1/10 701/70 |
| 2013/0173128 A1* | 7/2013 | Syed | ........................ | B60L 50/50 701/70 |
| 2013/0274971 A1* | 10/2013 | Takahashi | ............... | B60L 58/12 701/22 |
| 2014/0225721 A1* | 8/2014 | Simon | .................... | B60K 35/00 340/435 |
| 2014/0288751 A1* | 9/2014 | Shiogai | ................... | B60L 7/14 701/22 |
| 2015/0367746 A1* | 12/2015 | Maeno | ................... | B60K 35/00 701/22 |
| 2016/0243959 A1* | 8/2016 | Kishida | ................... | B60K 37/02 |
| 2017/0247027 A1* | 8/2017 | Nefcy | ..................... | B60K 6/54 |

FOREIGN PATENT DOCUMENTS

| | | |
|---|---|---|
| JP | 2008-020358 A | 1/2008 |
| JP | 2009-038900 A | 2/2009 |
| JP | 2009-145828 A | 7/2009 |
| JP | 2014-519612 A | 8/2014 |
| WO | WO 2011/026625 A1 | 3/2011 |

* cited by examiner

REGENERATED ENERGY DISPLAY DEVICE

TECHNICAL FIELD

The present invention relates to a regenerated energy display device that is installed in a vehicle.

BACKGROUND ART

In some vehicles including a motor such as a motor as a drive source for running, energy at the time of deceleration is collected and stored as electric energy, i.e., regenerated energy, to charge a power storage unit such as a battery. Some of these vehicles that can perform regeneration include a display device by which an occupant such as a driver is visually informed of an added amount of regenerated energy that is generated by the motor during regeneration, and such a vehicle is disclosed in PTL 1, for example.

CITATION LIST

Patent Literature

PTL 1: Japanese Unexamined Patent Application Publication No. 2009-38900

SUMMARY

Technical Problem

In PTL 1, although the added amount of the regenerated energy is displayed on a display device, the display gauge is constant. Accordingly, it is not possible to change the way of display, i.e., the display gauge, in accordance with an occupant's preference. Thus, an improvement in terms of usability is desired.

An object of the present invention is to improve usability by making it possible to change the display gauge of the added amount of the regenerated energy.

Solution to Problem

A regenerated energy display device according to the present invention is installed in a vehicle capable of collecting regenerated energy and includes a display unit that is capable of displaying information indicating an added amount of the regenerated energy; and a control unit that controls the display unit such that it is possible to change a gauge of the information indicating the added amount displayed on the display unit.

Advantageous Effects of Invention

According to the present invention, by making it possible to change the display gauge of the information indicating the added amount of the regenerated energy displayed on the display unit, a driver can change a display format of the added amount in accordance with his/her preference, which can improve usability.

DESCRIPTION OF EMBODIMENTS

Now, embodiments of the present invention will be described with reference to the drawings. In the embodiments, identical members or members having identical functions are denoted by identical reference numerals, and a repeated description thereof will be omitted as appropriate. Note that parts of components may be omitted, or cross-sections or schematic diagrams thereof may be illustrated, for easy understanding of the drawings.

Figure 1:
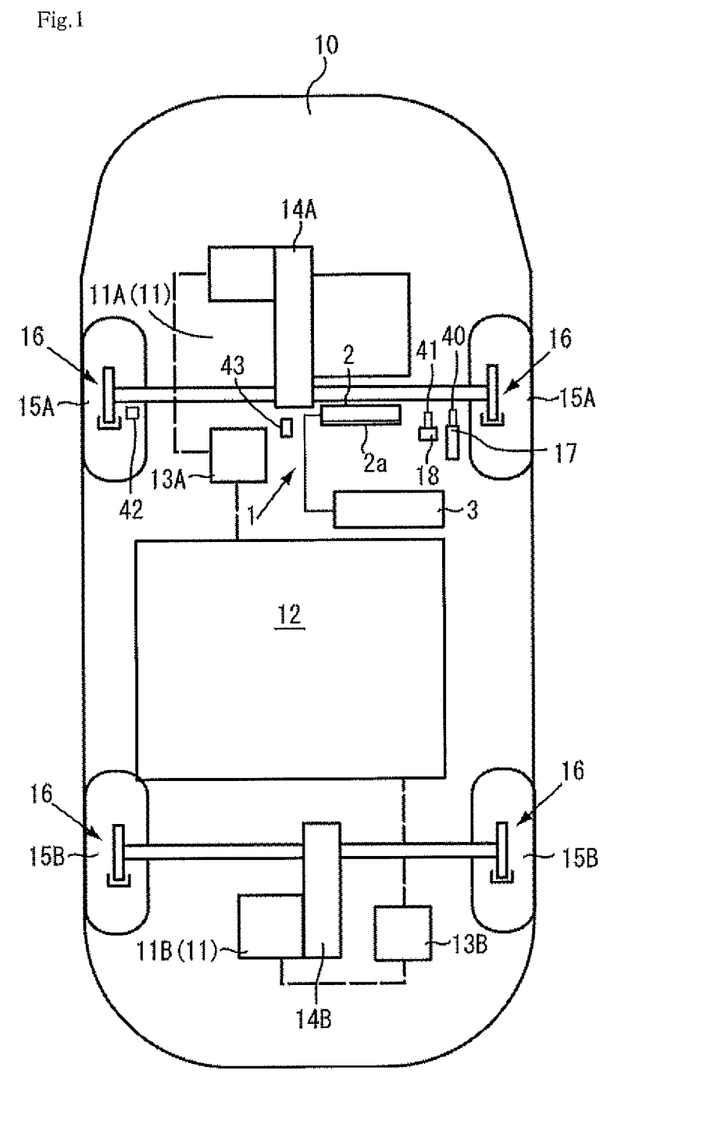
FIG. 1 is a schematic configuration diagram of a vehicle in which a regenerated energy display device according to the present invention is installed.

FIG. 1 is a schematic diagram illustrating the entire configuration of an electric vehicle 10 in which a regenerated energy display device 1 according to these embodiments is installed. In the vehicle 10, as drive sources for running, a front motor 11A and a rear motor 11B, which are motors, are disposed on the front side and the rear side, respectively. In the vehicle 10, a high-voltage battery 12 that is used for driving the front motor 11A and the rear motor 11B is installed.

The battery 12 is a power source unit and power storage unit and is charged with direct-current power in advance. The battery 12 can be charged by a power source device outside the vehicle or can be charged with electric energy that is generated during regeneration. The power that is discharged from the battery 12 is converted into alternate current by a front inverter 13A and a rear inverter 13B. Then, the alternate-current power from the front inverter 13A is supplied to the front motor 11A to rotationally drive the front motor 11A, and the alternate-current power from the rear inverter 13B is supplied to the rear motor 11B to rotationally drive the rear motor 11B.

The power that is output from the front motor 11A is transmitted to each of left and right front drive wheels 15A through a front transaxle 14A. The power that is output from the rear motor 11B is transmitted to each of left and right rear drive wheels 15B through a rear transaxle 14B.

The front motor 11A and the rear motor 11B are collectively referred to as "motors 11". The front inverter 13A and the rear inverter 13B are collectively referred to as "inverters 13". The front drive wheels 15A and the rear drive wheels 15B are collectively referred to as "drive wheels 15".

The vehicle 10 includes hydraulic braking devices 16 as a braking unit that supplies a braking force to the drive wheels 15. At the foot of the driver's seat of the vehicle 10, there are provided an accelerator pedal 17 that controls the vehicle velocity by controlling the output of the motors 15 and a brake pedal 18 that activates the braking devices 16. Reference numeral 40 denotes an acceleration sensor that detects ON/OFF of the accelerator pedal 17 and that outputs ON/OFF signals, and reference numeral 41 denotes a brake sensor that detects the depression of the brake pedal 18 and that outputs an ON signal. Reference numeral 42 denotes a velocity sensor that detects the vehicle velocity and that outputs velocity information, and reference numeral 43 denotes an ignition switch that sets a state in which the motors 11 can be activated.

The motors 11 are regeneratively driven during regeneration, which is the time of a deceleration operation of the vehicle 10, to serve as a power generator. The time of a deceleration operation is the time of running in an accelerator-off state by releasing the depression state of the accelerator pedal 17 or the time of braking when the brake pedal 18 is depressed. The kinetic energy that is the resistance on the drive wheels 15 side during a deceleration operation generates power as alternate-current power by regenerative driving of the drive motors 11 and is converted into direct current by the inverters 13. Then, the direct-current power is transmitted to the battery 12 and charges the battery 12 to be stored therein. In the vehicle 10 having such a regenerating function, by collecting the kinetic energy in the form of electric energy in the battery 12 through the regenerative driving of the motors 11, the energy is effectively used. In these embodiments, the amount of regenerated energy, i.e., the amount of electric energy, which is generated by the motors 11, is referred to as a regenerated amount Ra.

The regenerated energy display device 1 includes a display unit 2 that is capable of displaying various information items and a control unit 3 that controls details to be displayed on the display unit 2. The display unit 2 and the control unit 3 are configured independently of each other, and are connected so as to enable mutual communication via a signal line. The display unit 2 is disposed at, for example, the center of the dashboard of the vehicle 10, and the control unit 3 is disposed in the dashboard or the glovebox, in a space under the seat, or the like. Although the display unit 2 and the control unit 3 are configured independently of each other in these embodiments, the display unit 2 and the control unit 3 may be integrally configured.

Various information items that can be displayed include at least information regarding the regenerated energy, i.e., electric energy, which is generated at the time of regenerative driving of the motors 11, and the display unit 2 displays the information regarding the regenerated energy on a screen 2a. The control unit 3 controls the details displayed on the display unit 2 in accordance with a selected mode, which will be described later, or a set condition.

The regenerated energy display device 1 makes it possible to change, when displaying information regarding the regenerated energy, a display gauge of information indicating an added amount Aa of the regenerated energy, i.e., electric energy, which is generated by the motors 11 during regeneration. In these embodiments, information indicating a momentary amount Ma of the regenerated energy is also displayed on the screen 2a of the display unit 2.

By making it possible to change the display gauge of the information indicating the added amount Aa of the regenerated energy displayed on the display unit 2 in the above manner, a driver can change a display format of the added amount Aa in accordance with his/her preference, which can improve usability.

Next, the configuration of the regenerated energy display device 1 will be described in more detail.

Figure 2:
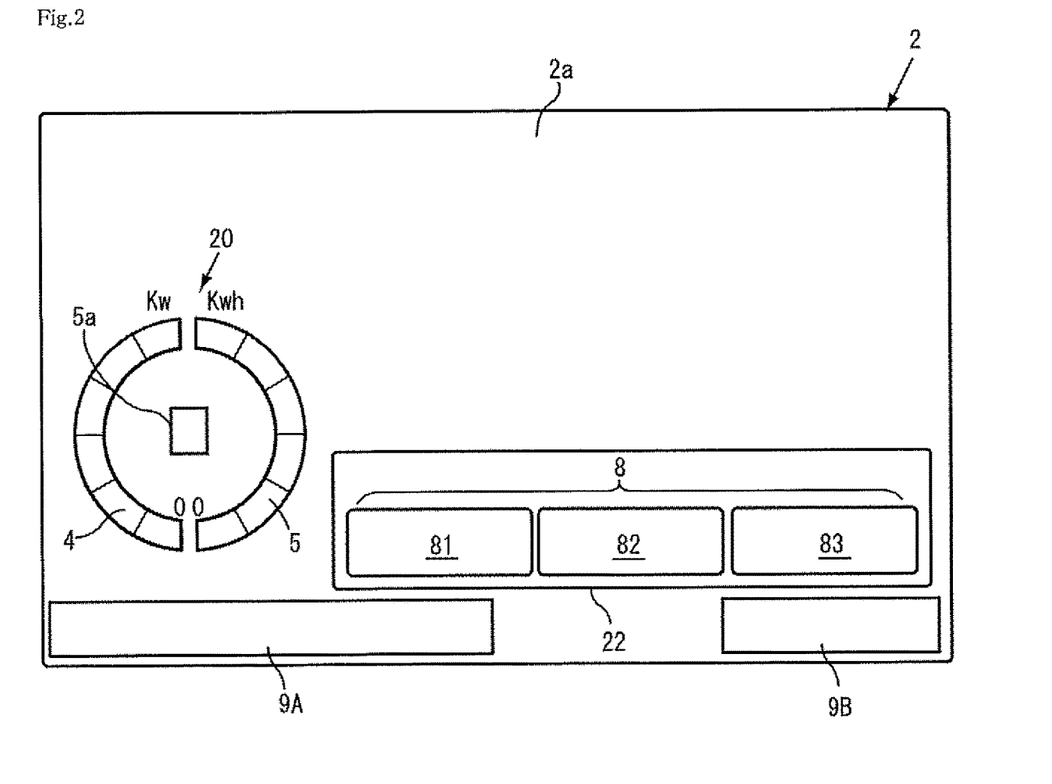
FIG. 2 illustrates a configuration of a display unit included in the regenerated energy display device according to the present invention and an example of displayed details.

The display unit 2 is configured from, for example, a well-known touch panel having an information displaying function and a contact detecting function for detecting a contact of an occupant's finger, an instrument, or the like on the screen 2a. The display unit 2 includes display areas 20 and 22. In the display area 20, the momentary amount Ma of the regenerated energy that is generated during regeneration and the added amount Aa of the regenerated amount Ra are respectively displayed as a graph 4 and a graph 5 each shaped in a semi-circular arc as illustrated in FIG. 2. In the display area 22, a display-gauge selecting unit 8 is displayed. In these embodiments, the display area 22 forms an operation unit. The graph 4 is displayed as information indicating the momentary amount Ma, and the graph 5 is displayed as information indicating the added amount Aa, each in the display area 20 of the display unit 2.

The display-gauge selecting unit 8 is operated by an occupant when changing a gauge that is a displayed level of the added amount Aa of the regenerated energy. The changing of the gauge herein means to change the upper limit of the added amount Aa to be displayed. The display-gauge selecting unit 8 includes a plurality of selection switches 81, 82, and 83 for the occupant to freely select a gauge of the added amount Aa to be displayed. Although the three selection switches 81, 82, and 83 are provided as the gauge selecting unit so that any of the three gauges can be displayed in these embodiments, a plurality of gauges can be selected by using a single selection switch by different operation methods.

Figure 4:
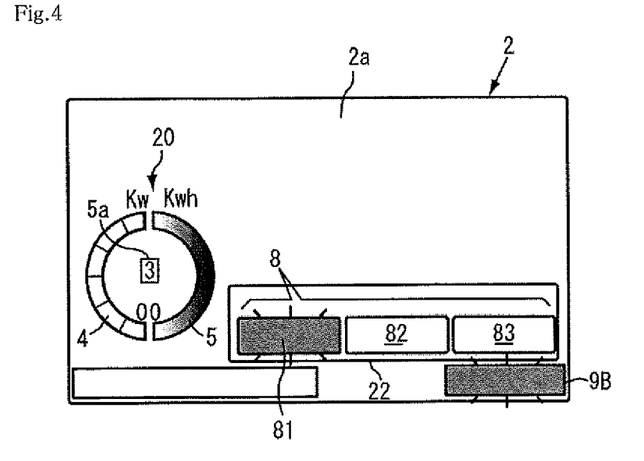
FIG. 4 illustrates an example of a screen of a display unit in a first embodiment, which is an embodiment of display control of an added amount of regenerated energy.
Figure 5:
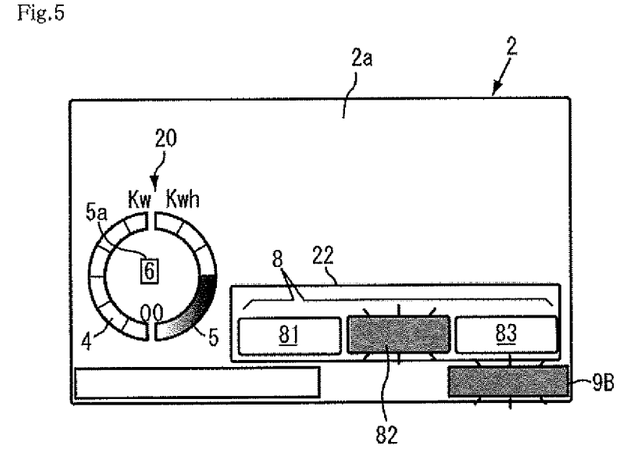
FIG. 5 illustrates another example of the screen of the display unit in the first embodiment, which is an embodiment of display control of the added amount of regenerated energy.
Figure 6:
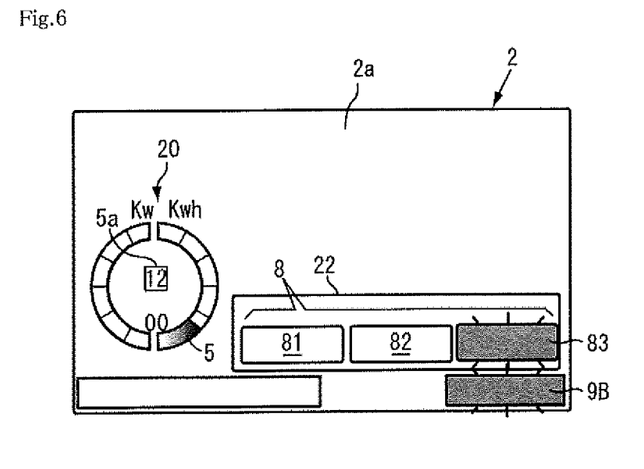
FIG. 6 illustrates still another example of the screen of the display unit in the first embodiment, which is an embodiment of display control of the added amount of regenerated energy.

In response to an operation of any of the selection switches 81 to 83, the graph 5 in which the gauge is changed to the gauge, i.e., the upper limit of the added amount, corresponding to the operated selection switch is displayed on the screen 2a. For example, the gauge of the graph 5 in the display area 20 is changed as follows. If an occupant selects the selection switch 81, the upper limit of the displayed unit is changed to 3 kWh as illustrated in FIG. 4; if an occupant selects the selection switch 82, the upper limit is changed to 6 kWh as illustrated in FIG. 5; if an occupant selects the selection switch 83, the upper limit is changed to 12 kWh as illustrated in FIG. 6.

That is, the selection switches 81, 82, and 83 that are the gauge selecting unit are used for freely selecting a value as the maximum value of the gauge of the graph 5, which is the information indicating the added amount Aa to be displayed on the display unit 2. The control unit 3 controls the display unit 2 to display the graph 5, which is the information indicating the added amount Aa by using the gauge, i.e., the maximum value, selected by using the gauge selecting unit. In addition, in these embodiments, in response to any of the selection switches 81 to 83 being selected, not only the graph 5 indicating the added amount Aa, but also gauge information, i.e., numeric information 5a, indicating the upper limit corresponding to the selected gauge is displayed in the display area 20 of the screen 2a.

A guidance switch 9A that is selected when guidance details regarding the regenerated energy is displayed on the screen 2a is displayed on the display unit 2. When the guidance switch 9A is selected by a driver, for example, the control unit 3 switches the displayed details on the screen 2a to display guidance details in the form of text and image on the screen 2a of the display unit 2.

A confirmation switch 9B is displayed on the screen 2a of the display unit 2. The confirmation switch 9B is operated by a driver when confirming operation details of the display-gauge selecting unit 8 and the guidance switch 9A. The confirmation switch 9B is also a component of the operation unit.

Each of the display-gauge selecting unit 8, the guidance switch 9A, and the confirmation switch 9B is displayed as an icon on the screen 2a and configured to output an electric signal corresponding to the switch by the icon of the switch being pressed, i.e., tapped, by a fingertip or an instrument. The control unit 3 acquires the signal output when any of the switches displayed on the screen 2a is operated and determines which switch has been selected.

The control unit 3 is configured from a computer including a CPU, which is a computation unit, and RAM, ROM, and the like, which are memory. The control unit 3 may be a control unit that controls the entire vehicle 10 or may be a control unit that is dedicated to control of the display unit 2.

Figure 3:
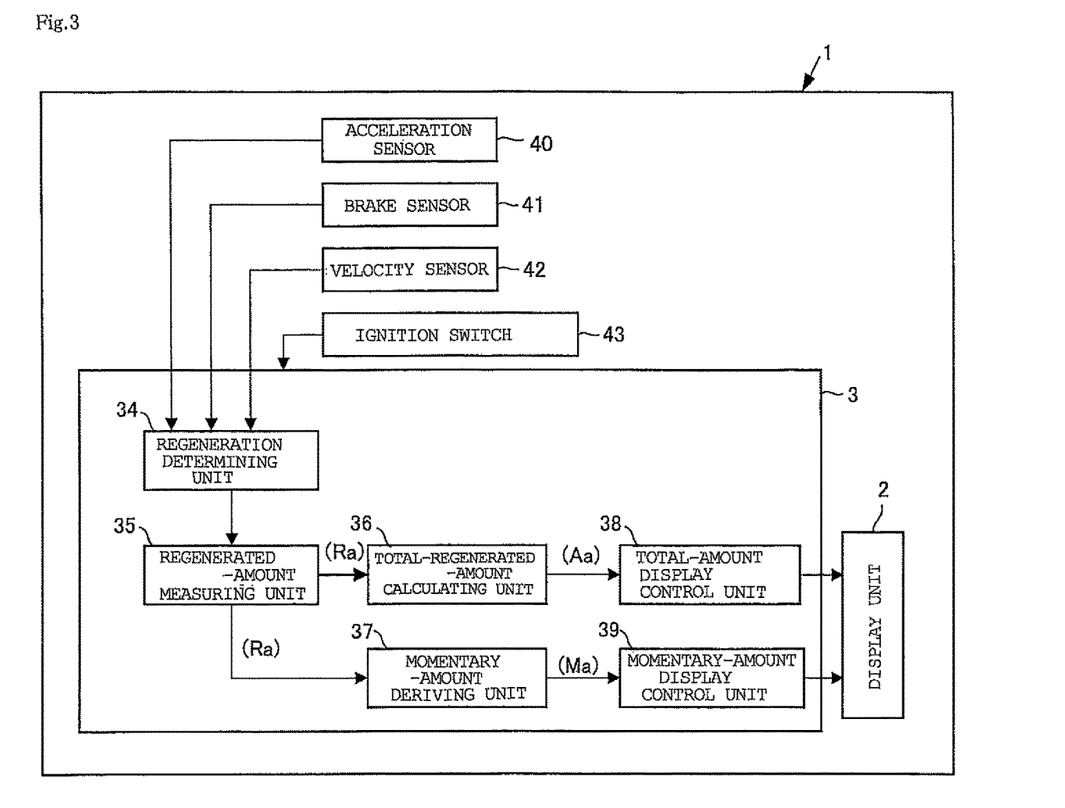
FIG. 3 is a block unit illustrating a configuration of an embodiment of the regenerated energy display device according to the present invention.

As illustrated in FIG. 3, the control unit 3 includes a regeneration determining unit 34 that determines whether regeneration is being performed and a regenerated-amount measuring unit 35 that measures the regenerated amount Ra, which is the amount of regenerated energy that is generated by regenerative driving of the motors 11. The control unit 3 includes a total-regenerated-amount calculating unit 36 that calculates the added amount Aa of the regenerated amount Ra measured by the regenerated-amount measuring unit 35 and a momentary-amount deriving unit 37 that derives the momentary amount Ma of the regenerated amount Ra measured by the regenerated-amount measuring unit 35. The control unit 3 includes a total-amount display control unit 38 that controls the display unit 2 to display the information of the added amount Aa on the display unit 2 as the graph 5 and a momentary-amount display control unit 39 that controls the display unit 2 to display the information of the momentary amount Ma on the display unit 2. The control unit 3 is configured such that the regenerated amount Ra measured by the regenerated-amount measuring unit 35, the added amount Aa calculated by the total-regenerated-amount calculating unit 36, and the momentary amount Ma derived by the momentary-amount deriving unit 37 are stored in the RAM. The ROM of the control unit 3 stores gauge-display changing modes 1 and 2 and various set values used for control thereof.

If a deceleration operation such as a brake depressing operation or an accelerator-off state is performed while the vehicle 10 is running, the regeneration determining unit 34 determines that regeneration is being performed. Whether the vehicle 10 is running may be determined on the basis of the presence or absence of velocity information from the velocity sensor 42. Whether a deceleration operation is being performed can be determined on the basis of an ON/OFF signal of the accelerator pedal 17 detected by the acceleration sensor 40 or the presence or absence of a depression detection signal of the brake pedal 18 output from the brake sensor 41.

In these embodiments, the acceleration sensor 40, the brake sensor 41, and the ignition switch 13 are connected to the control unit 3 via a signal line and output ON/OFF information of these to the control unit 3. The velocity sensor 42 is connected to the control unit 3 via a signal line and outputs the velocity information to the control unit 3.

The regenerated-amount measuring unit 35 is configured from a voltage measurement device that detects a voltage to be converted into direct current by the inverters 13 to be transmitted to the battery 12. The total-regenerated-amount calculating unit 36 is a computation unit that calculates the added amount Aa by sequentially adding the regenerated amount Ra measured by the regenerated-amount measuring unit 35 and is configured from the CPU of the control unit 3.

The total-amount display control unit 38 controls the display unit 2 such that the area of the graph 5 in the circular arc shape displayed on the display unit 2 is increased or decreased in the vertical direction in accordance with an increase or a decrease in the added amount Aa by using Kwh. In addition, upon an operation of any of the selection switches 81 to 83, the total-amount display control unit 38 controls the display unit 2 to change the upper limit, which is the display gauge, in accordance with the operated selection switch to be displayed as the gauge information 5a in the display area 20 of the screen 2a.

The momentary-amount display control unit 39 converts the momentary amount Ma into Kw, controls the display unit 2 such that the circular arc area of the graph 4 displayed in the display area 20 of the screen 2a to vary in the vertical direction in accordance with the value of the momentary amount Ma.

First Embodiment

Figure 7:
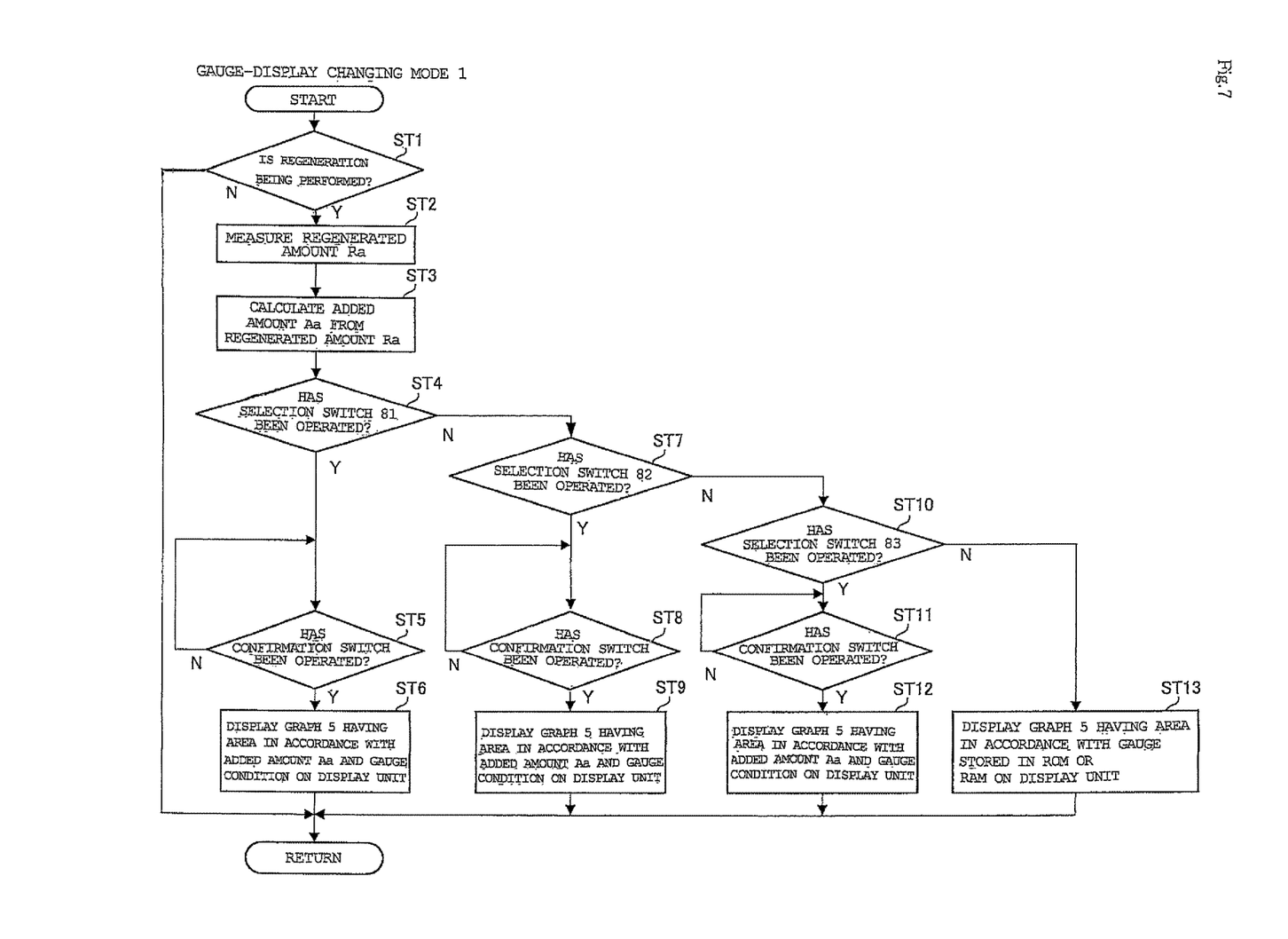
FIG. 7 is a flowchart illustrating details of a gauge-display changing mode 1, which is the first embodiment.

Next, the gauge-display changing mode 1 will be described with reference to FIGS. 4 to 6 and FIG. 7. FIGS. 4 to 6 illustrate changes in the operation screen when the gauge of the added amount Aa of the regenerated energy is selected and changed by operating the display-gauge selecting unit 8. FIG. 7 is a flowchart illustrating details of gauge-display changing control in the gauge-display changing mode 1.

The control unit 3 determines whether regeneration is being performed in step ST1 in FIG. 7. If a deceleration operation such as a brake operation or accelerator-off state is performed while the vehicle 10 is running, the control unit 3 determines that regeneration is being performed in which the motors 11 are regeneratively driven, and the process proceeds to step ST2. If the motors 11 are regeneratively driven, regenerated energy, that is electric energy, is generated to charge the battery 12.

In step ST2, the control unit 3 measures the regenerated amount Ra by using the regenerated-amount measuring unit 35. In step ST3, the control unit 3 adds the regenerated amount Ra measured by using the regenerated-amount measuring unit 35 to the last-time value by using the total-regenerated-amount calculating unit 36 to calculate the added amount Aa, and the process proceeds to step ST4.

In step ST4, the control unit 3 determines, in this example, whether the selection switch 81 has been operated on the basis of the presence or absence of a signal that is output by an operation of the selection switch 81. In response to detection of a signal from the selection switch 81, the control unit 3 determines that the selection switch 81 has been operated and selected, and the process proceeds to step ST5 in which the control unit 3 determines the presence or absence of an operation of the confirmation switch 9B on the basis of the presence or absence of a signal that is output from the confirmation switch 9B. The control unit 3 is in a waiting state until the confirmation switch 9B is operated. In response to detection of a signal of an operation of the confirmation switch 9B, the process proceeds to step ST6.

In step ST6, the control unit 3 controls the display unit 2 to display the graph 5 on the screen 2a such that the area of the graph 5 in the circular arc shape displayed on the display unit 2 is increased in accordance with an increase in the added amount Aa by using 3 kWh, which is the selected upper limit, as an upper limit of the added value Aa to be displayed. In addition, the control unit 3 also displays "3", which is the gauge information 5a indicating the upper limit corresponding to the selected gauge. In this example, the screen is displayed as illustrated in FIG. 4.

If there is no operation signal from the selection switch 81 in step ST4, in this example, the control unit 3 determines in step ST7 whether the selection switch 82 has been operated on the basis of the presence or absence of a signal that is output by an operation of the selection switch 82. In response to detection of a signal from the selection switch 82, the control unit 3 determines that the selection switch 82 has been operated and selected, and the process proceeds to step ST8.

If there is no operation signal from the selection switch 82 in step ST7, in this example, the control unit 3 determines in step ST10 whether the selection switch 83 has been operated on the basis of the presence or absence of a signal that is output by an operation of the selection switch 83.

In response to detection of a signal from the selection switch 83, the control unit 3 determines that the selection switch 83 has been operated and selected, and the process proceeds to step ST11. If there is no signal from the selection switch 83, the process proceeds to step ST13 in which the graph 5 having an area corresponding to the gauge of the set value that is stored in advance in the ROM or RAM of the control unit 3 is displayed on the screen 2a of the display unit 2.

In step ST8 and step ST11, the control unit 3 determines the presence or absence of an operation of the confirmation switch 9B by assuming that an occupant has selected 6 kWh as the upper limit if the selection switch 82 has been selected, or by assuming that an occupant has selected 12 kWh as the upper limit if the selection switch 83 has been selected. If the confirmation switch 9B has been operated, the control unit 3 proceeds to step ST9 and step ST12.

In step ST9, the control unit 3 controls the display unit 2 to display the graph 5 on the screen 2a such that the area of the graph 5 in the circular arc shape displayed on the display unit 2 is increased or decreased in the vertical direction in which 6 kWh, which is the selected upper limit, is the upper limit of the added value Aa to be displayed, and to display "6", which is the gauge information 5a indicating the upper limit corresponding to the selected gauge. In this example, the screen illustrated in FIG. 5 is displayed.

In step ST12, the control unit 3 controls the display unit 2 to display the graph 5 on the screen 2a such that the area of the graph 5 in the circular arc shape displayed on the display unit 2 is increased or decreased in the vertical direction in which 12 kWh, which is the selected upper limit, is the upper limit of the added value Aa to be displayed, and to display "12", which is the gauge information 5a indicating the upper limit corresponding to the selected gauge. In this example, the screen illustrated in FIG. 6 is displayed. That is, in this embodiment, the control unit 3 controls the display unit 2 such that the upper limit of the information indicating the added amount Aa displayed on the display unit 2 is changed for display.

In the above manner, if it is possible to change the maximum value, which is the display gauge of the information indicating the added amount Aa of regenerated energy displayed on the display unit 2, it is possible to change the display format of the added amount Aa of regenerated energy in accordance with preference of an occupant who has operated the screen. Thus, usability can be improved.

Although, for example, the ROM of the control unit 3 is set in advance such that the displayed upper limit of the added amount Aa becomes 3 kWh, 6 kWh, or 12 kWh when the selection switch 81, 82, or 83 is selected in this embodiment, the displayed upper limit is not limited to any of these values and can be set freely.

In this embodiment, information indicating the momentary value Ma of the regenerated energy is displayed as the graph 4 in the display area 20. As for this display process, the display or non-display may be selected freely by providing an operation unit, for example. In this embodiment, it is automatically displayed in response to the vehicle 1 performing regeneration.

That is, after measuring the regenerated amount Ra during regeneration by using the regenerated-amount measuring unit 35, the control unit 3 derives the momentary amount Ma by using the momentary-amount deriving unit 37, and in accordance with the value of the momentary amount Ma, controls the display unit 2 by using the momentary-amount display control unit 39 such that the area of the graph 4 in the circular arc shape displayed on the display unit 2 is increased or decreased in the vertical direction to display the graph 4 on the screen 2a as illustrated in FIG. 2, for example.

Second Embodiment

Next, the gauge-display changing mode 2 will be described with reference to FIGS. 8 to 10 and FIG. 11.

In the gauge-display changing mode described with reference to FIGS. 4 to 7, a plurality of upper limits of the added amount Aa displayed on the display unit 2 are set in advance, and an upper limit is selected by using the display-gauge selecting unit 8 so as to change the upper limit of the graph 5 that can be displayed. In contrast, in this embodiment, as illustrated in FIG. 8, on the basis of a condition selected by using a condition selecting unit 6 for selecting a condition for changing a gauge of information indicating the added amount Aa, the gauge of the graph 5, which is the information indicating the added amount Aa, is changed for display.

In this embodiment, the condition for changing the gauge of the information indicating the added amount Aa is automatic change. On the screen 2a of the display unit 2, as illustrated in FIG. 8, a display area 23 for displaying the condition selecting unit 6 is provided. The condition selecting unit 6 includes an auto-switch 61 that is selected when the gauge is automatically switched, and a cancel switch 62 that is selected when the automatic gauge changing set by the auto-switch 61 is canceled. The auto-switch 61 and the cancel switch 62 are displayed as icons on the screen 2a by the control unit 3.

In this embodiment, the control unit 3 illustrated in FIG. 3 controls the display unit 2 to display, in the display area 20 of the display unit 2, the gauge of the graph 5, which is the information indicating the added amount Aa of the regenerated energy, in a changeable manner on the basis of the condition selected by using the condition selecting unit 6. The ROM of the control unit 3 stores a gauge automatic changing mode in which the gauge of the added amount Aa of the regenerated energy is automatically switched on the basis of the selected condition, a determination value T1 for display switching that is set in advance, and a plurality of gauge information items. The gauge automatic changing mode is started in response to selection of the auto-switch 61 by a tap operation or the like, and if the cancel switch 62 is operated and selected, the gauge automatic changing mode is stopped. The plurality of gauge information items are, for example, upper limits for changing the gauge, which are 3 Kwh, 6 Kwh, and 12 Kwh in this example, and are automatically changed from a smaller value to a larger value. The condition for automatic switching is whether the added amount Aa becomes greater than or equal to the set upper limit, that is, the determination value T1.

Figure 8:
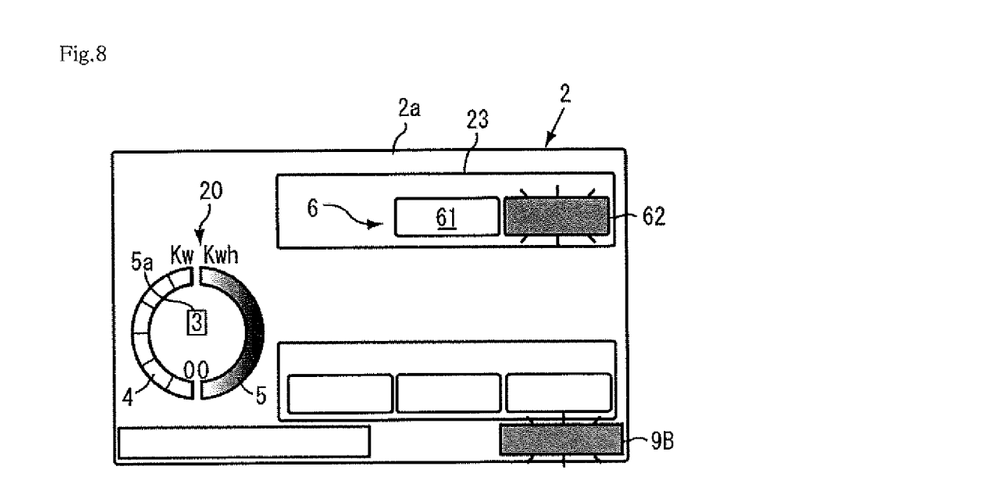
FIG. 8 illustrates an example of a screen of a display unit in a second embodiment, which is an embodiment of display control of an added amount of regenerated energy.
Figure 11:
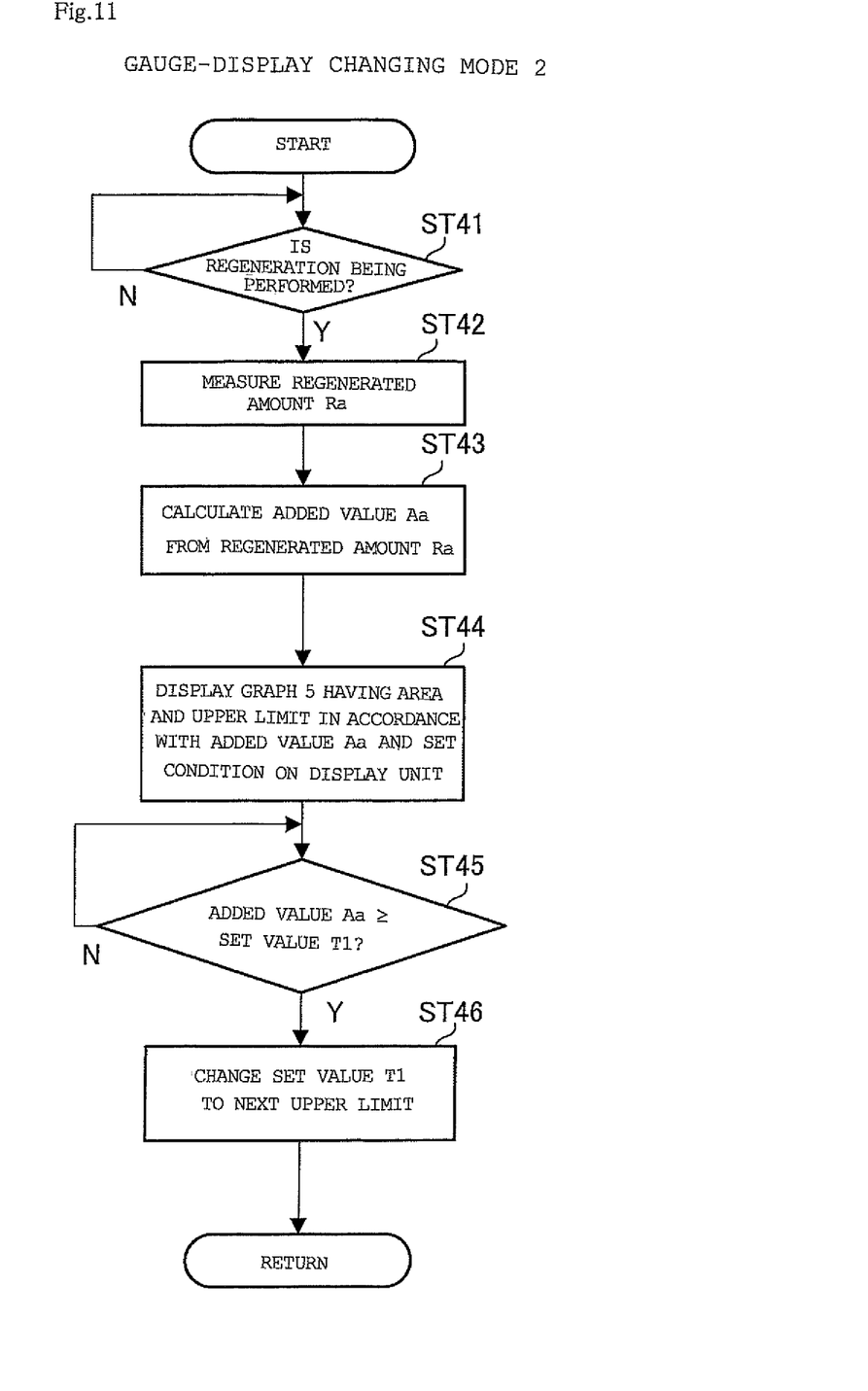
FIG. 11 is a flowchart illustrating details of a gauge-display changing mode 2, which is the second embodiment of display control of the added amount of regenerated energy.

As illustrated in FIG. 8, upon an operation of the auto-switch 61, the control unit 3 executes the gauge automatic changing mode illustrated in FIG. 11. As in step ST1 to ST3 in FIG. 7, in steps ST41, ST42, and ST43, the control unit 3 measures the regenerated amount Ra of the regenerated energy of the motors 11 during regeneration by using the regenerated-amount measuring unit 35 and calculates the added amount Aa of the regenerated amount Ra by using the total-regenerated-amount calculating unit 36.

In this embodiment, if, for example, an upper limit 3 kWh is set as an initial value in step ST44, the control unit 3 controls the display unit 2 to display the graph 5 in the display area 20 of the screen 2a such that the area of the graph 5 in the circular arc shape displayed on the display unit 2 is increased in accordance with an increase in the added amount Aa, and to display "3", which is the gauge information 5a indicating the upper limit corresponding to the gauge of the initial value in advance. In this example, the screen is displayed as illustrated in FIG. 8.

Figure 9:
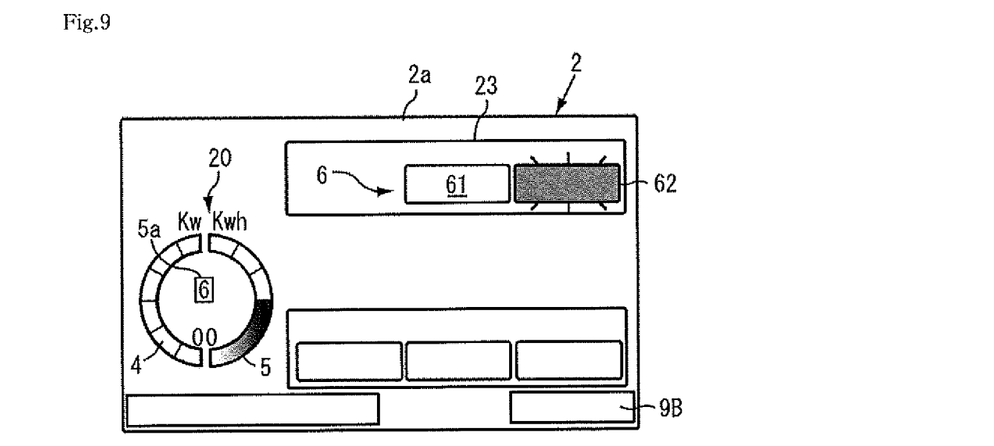
FIG. 9 illustrates another example of the screen of the display unit in the second embodiment, which is an embodiment of display control of the added amount of regenerated energy.

Subsequently, in step ST45 in FIG. 11, the control unit 3 determines whether the added amount Aa exceeds the upper limit T1 that is set. The upper limit T1 in this example is 3 kWh. If the added amount A≥upper limit T1, the control unit 3 proceeds to step ST46 and changes the upper limit T1 to 6 kWh, which is the next upper limit. In this example, the screen is displayed as illustrated in FIG. 9.

Figure 10:
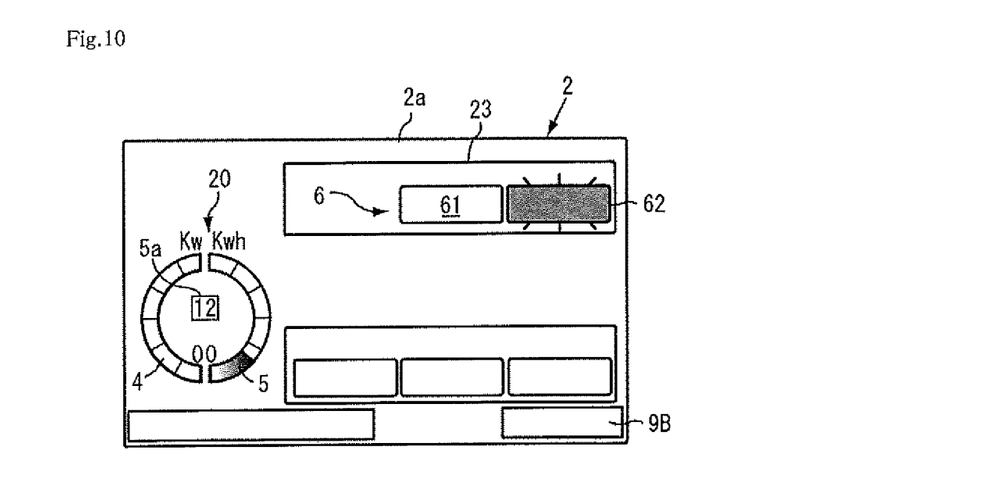
FIG. 10 illustrates still another example of the screen of the display unit in the second embodiment, which is an embodiment of display control of the added amount of regenerated energy.

Thus, in step ST44 in the next control cycle, "6", which is the gauge information 5a indicating the upper limit, is displayed, and the graph 5 using 6 kWh as the display upper limit is displayed in the display area 20 of the screen 2a. In this embodiment, in step ST44 in the further next control cycle, "12", which is the gauge information 5a indicating the upper limit, is displayed, and the graph 5 using 12 kWh as the display upper limit is displayed in the display area 20 of the screen 2a. In this example, the screen is displayed as illustrated in FIG. 10.

With such a configuration, by an occupant operating the auto-switch 61, the graph 5 indicating the added amount Aa of the regenerated energy is changed by being sequentially updated within a range of upper limits that are set in advance, and thus, a driver can be motivated to care about the regenerated energy during regeneration while driving, which can improve usability.

Note that if the added amount Aa of the regenerated energy exceeds the set upper limit, it is automatically changed to another upper limit, which is the next gauge in this embodiment. However, for example, the set condition that is set in advance may be the upper limit that is initially set, and if the added amount Aa becomes equal to the upper limit that is the set condition set in advance, for example, 3 kWh, the color of the graph 5, which is the information indicating the added amount Aa displayed on the display unit 2 may be changed to color that is different from the previous color before reaching the upper limit for display.

In this manner, by making it possible to change the color of the graph indicating the added amount Aa of the regenerated energy displayed on the display unit 2 and by controlling the display unit 2 to change for display the color of the information indicating the added amount Aa displayed on the display unit 2 upon the set condition being satisfied, it is possible to visually inform an occupant, especially a driver, of regeneration information, and a driver can be motivated to further care about the regenerated energy during regeneration while driving, which can improve usability.

Note that the value of the integrated value Aa may be reset for display for each running condition in the first and second embodiments.

Although the preferred embodiments of the present invention have been described above, the present invention is not limited to the specific embodiments. Various deformations and modifications can be made without departing from the spirit of the present invention described in the scope of the claims unless specifically limited in the above description.

For example, the electric vehicle 10 using the front motor 11A and the rear motor 11B as drive sources for running is illustrated as an example. However, a vehicle to which the present invention is applicable may be a hybrid vehicle including any one of the front motor 11A and the rear motor 11B and an internal combustion engine in combination as long as the regenerating function is included.

Although the battery 12 has been illustrated as an example of the power storage unit of the front motor 11A and the rear motor 11B in the embodiments, a capacitor, which is a well-known storage battery, may also be used as the power storage unit.

The effects described in the embodiments of the present invention are merely the most preferred ones produced by the present invention. The effects of the present invention are not limited to those described in the embodiments of the present invention.

REFERENCE SIGNS LIST

1 regenerated energy display device
2 display unit
3 control unit
5 information indicating added amount
10 vehicle
Aa added amount
6 condition selecting unit
8 gauge selecting unit

The invention claimed is:
1. A regenerated energy display device that is installed in a vehicle capable of collecting regenerated energy, the regenerated energy display device comprising:
 a display unit that is capable of displaying information indicating an added amount of the regenerated energy;
 a control unit that controls the display unit such that it is possible to change a gauge of the information indicating the added amount displayed on the display unit; and
 a condition selecting unit that automatically changes the gauge of the information indicating the added amount displayed on the display unit when the added amount becomes greater than or equal to an individually set upper limit, wherein the control unit controls the display unit such that the information indicating the added amount is displayed on the basis of a condition selected by using the condition selecting unit.

2. The regenerated energy display device according to claim 1, further comprising a gauge selecting unit for freely selecting the gauge of the information indicating the added amount displayed on the display unit, wherein the control unit controls the display unit such that the information indicating the added amount is displayed by using a gauge selected by using the gauge selecting unit.

3. The regenerated energy display device according to claim 1, wherein the control unit controls the display unit such that color of the information indicating the added amount displayed on the display unit is changed for display upon the added amount satisfying a set condition that is set in advance.

4. The regenerated energy display device according to claim 2, wherein the control unit controls the display unit such that color of the information indicating the added amount displayed on the display unit is changed for display upon the added amount satisfying a set condition that is set in advance.

* * * * *